Nov. 19, 1963
B. H. LOCKE
3,111,331
STAIR-CLIMBING WHEEL CHAIR
Filed March 5, 1962
2 Sheets-Sheet 1
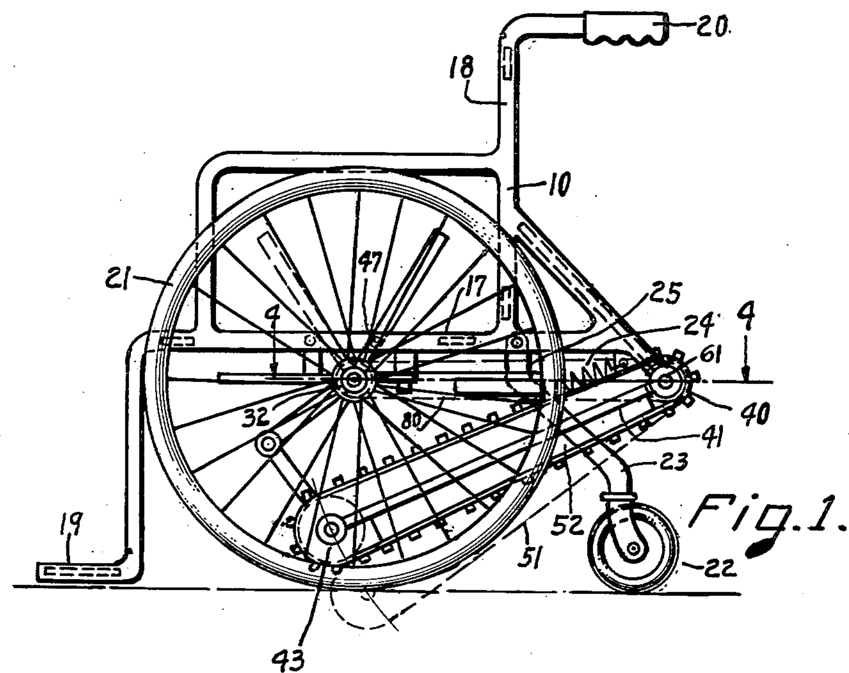
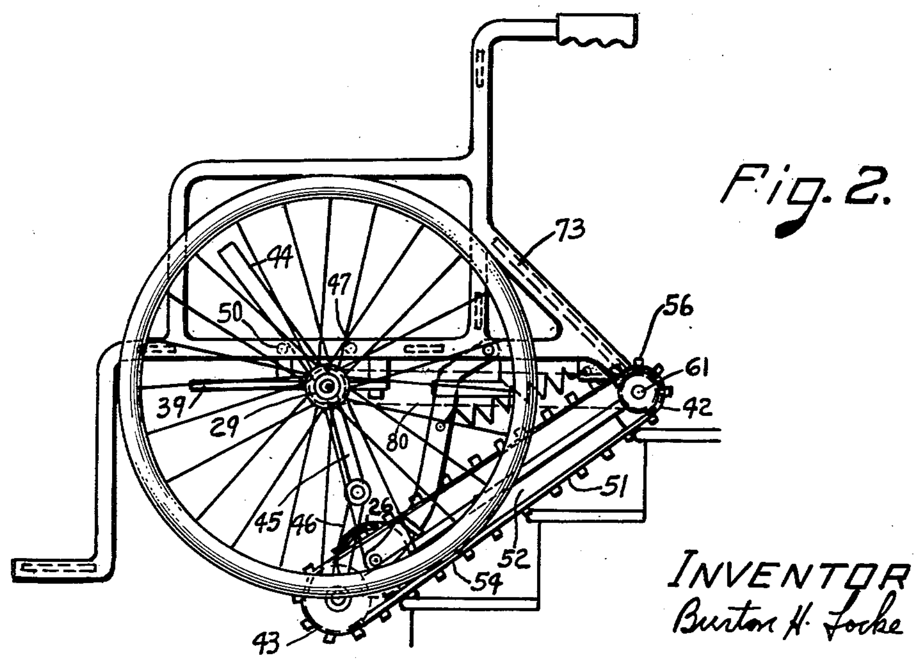
INVENTOR
Burton H. Locke STAIR-CLIMBING WHEEL CHAIR
Filed March 5, 1962
2 Sheets-Sheet 2
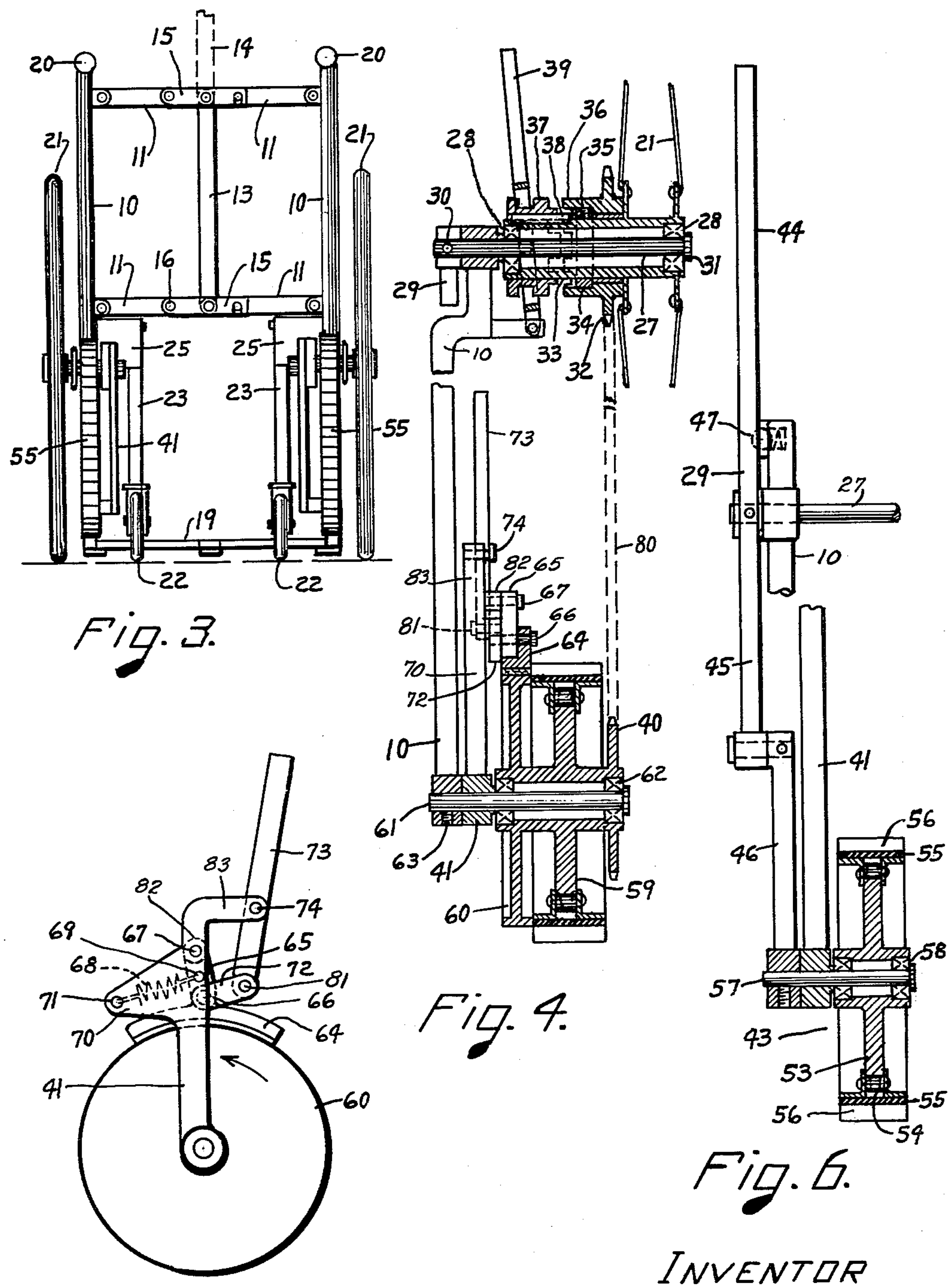
INVENTOR
Burton H. Locke 3,111,331

STAIR-CLIMBING WHEEL CHAIR

Burton H. Locke, 19 Nelson St., Framingham, Mass.

Filed Mar. 5, 1962, Ser. No. 177,329

8 Claims. (Cl. 280—5.22)

This invention relates to an improved self-propelled and controlled wheel chair, or vehicle, for use of invalids the propelling and meneuvering of which is accomplished by the occupant of the vehicle, and which is adapted to travel along a smooth surface and also over obstructions, such as stairs and curbs, etc.

An object of the invention is to provide a wheel chair, or vehicle, that can be operated on a smooth surface like a conventional wheel chair in that it has two main drive wheels and two maneuverable swivel wheels and a chair with back and foot rest and handles at the rear for the use of an attendant, when required, and to further provide a simple and easily manueverable structure which the occupant can readily put into service to override obstructions, such as a curb, or stairs, for example.

Another object is to provide a structure wherein the chair remains substantially upright when the vehicle is traveling up a stairs, for example, as well as on level surfaces. This is accomplished by providing a stair climbing structure that can be pivoted in substantial parallelism with the stairs while the chair remains upright.

Another object is to provide a structure that can be driven up, or eased down, as the case may be, a flight of stairs and turned in a small space such as encountered on L and U type landings and then mobiled over the next flight of stairs without requirement of changing gear during the interchange thus minimizing operational requirement of the occupant.

To accomplish these objects, I conceive a plurality of belt traction devices that can be swung into service by the occupant of use during the stair climbing operation, that is up a flight of stairs and over a landing and then up the next flight without further manipulation.

Another objective is to provide a simple means that will automatically check any backward movement of the vehicle when ascending a stairs for reason of safety and that can be readily manipulated by the occupant to serve in braking the vehicle when descending stairs by gravity.

Another object is to provide a vehicle that can be collapsed, or reduced to a smaller size, to permit being transported in the trunk of an automobile.

Another object is to provide a chair that is relatively light in weight for ease in transporting and maneuvering, etc.

Other objectives are simplicity of construction by confining to a minimum number of parts and to minimize the number of operational requirements to simplify operation and to provide a vehicle that can be offered at a reasonable cost so as not to limit its users.

In the accompanying drawing:

FIGURE 1 is a side elevation of my chair in condition to travel on plane surfaces.

FIGURE 2 is a side elevation of the same when in condition to travel on stairs, for example.

FIGURE 3 is a rear elevation of that shown in FIGURE 1.

FIGURE 4 is an enlarged section taken on line 4—4, of FIGURE 1.

FIGURE 5 is a side view of the brake control mechanism.

FIGURE 6 is a view showing the traction device shifting mechanism with the traction device shown in section.

My improved wheel chair comprises a pair of light weight rigid tubular main side frames 10 held in spaced parallelism by a plurality of light weight collapsible bar members 11. As shown in FIGURE 3, the bars are pivotally attached to the side frames and to a center bar 13 and when bar 13 is raised as shown by dotted lines 14 the side frames 10 will move toward each other and thus reduce the overall width of the device for transporting in a trunk of an automobile.

Simple means, such as a latch plate 15 which is attached to two adjacent bars 11, as at 16, could be employed to retain the side frames in spaced position when the chair is being used. Obviously, other collapsible structure could be employed to serve in place of that shown.

Referring to FIGURE 1, each frame 10 has a portion 17 with lateral bar members such as 11 forming a collapsible chair seat and a portion 18 with similar lateral members to form a collapsible back for the chair. A foot rest 19 is integral with the side frames and a handle portion 20 which could be used by an attendant in manipulating the vehicle is provided at the rear of each side frame. Rigid seat and back pads which are provided for the chair are not shown for reason of clarity.

A conventional large rubber tired wheel 21 is rotatively mounted to each side frame 10 and a conventional smaller swivel wheel 22 is mounted on an arm 23. Arm 23 is pivotally attached to frame 10 and held in vertical position by an extension spring 24 resiliently forcing the bar against a lug portion 25 of frame 10. The purpose of mounting wheels 22 in this manner is to permit them to swing to position shown by 26, FIGURE 2, when they come in contact with a stair, or other obstruction, as indicated in FIGURE 2, and thereby permit the traction belts to contact the stairs.

Referring to FIGURE 4, which shows structure common to both sides of the vehicle, the wheel 21, shown fragmentally, is rotatively mounted on a shaft 27 by means of bearings 28. Shaft 27 is retained in the side frames 10 by means of a bell crank lever 29, to be set forth hereinafter, being secured to shaft 27 by a tapered pin 30. This also retains the wheel and bearings, in cooperation with the enlarged outer end 31 of the shaft.

A sprocket 32 is rotatively mounted on the inner extended sleeve portion 33 of wheel 21 between the wheel hub and a collar 34 secured to said hub portion by set screw 35. Sprocket 32 has a plurality of jaws 36 which mate with similar jaws on a sleeve 37 which is slidably mounted on sleeve portion 33 and is caused to rotate therewith by a key 38. A conventional shift lever 39 is conventionally mounted to side frame 10 to effect sliding of sleeve 37 in engagement with sprocket 32 to cause sprocket 32 to rotate with wheel 21.

Sprocket 32 is disposed to drive a sprocket 40 on a belt traction device, to be explained hereinafter, by means of a chain 80, when said jaws are engaged. When the jaws are disengaged the sprocket 32 and thus the chain 80 will remain at rest when the wheel 21 is rotated.

Obviously, the jaws would be engaged by the occupant manipulating lever 39 only when the belt traction device is required for over-riding an obstruction.

Referring to FIGURES 1 and 2, each belt traction device is pivotly mounted on a side frame 10 at 42 by a stud 61 secured in frame 10 by means to be set forth hereinafter and each device comprises a frame 41 which supports a drive sprocket unit at 42 and an idler sprocket unit at 43. The pivoting of frame 41 will bring the idler unit 43 down below the wheels 21, as shown in FIGURE 2, and is accomplished by toggle linkage, note FIGURE 6, which comprises the bell crank lever 29 having an upwardly extended portion 44 to be manipulated by the occupant to swing the forward portion 45 of the lever downward and thereby swing a connecting link 46, which is pivoted to portion 45 and to unit 43, past the centerline between the center of lever 29 and unit 43. The handle portion 44 of lever 29 then abuts a pin 50 secured in frame 10. The pin 50 functions to retain unit 43 in its down position for reason of the past center position of the linkage.

When the unit 43 is raised to its upper position, as shown in FIGURE 1, the lever 29 is held by a resiliently mounted ball 47 positioned in frame 10 and engaging a detent in lever 29, see FIGURE 6.

The disposition of units 42 and 43 are such as to form a surface 51 inclined with the wheels for the purposes of contacting stairs as shown in FIGURE 2 when the traction device is lowered by lever 29. The lowering of the unit 43 will raise the vehicle and thereby lift wheels 21 out of contact with the surface on which they were operating.

The vehicle could be turned in a small space when resting on the chain belts 54, to be explained hereinafter, as well as on the wheels 21 for reason that each traction belt is independently driven from a drive wheel 21.

As set forth, the units 42 and 43 are disposed to effect proper inclined straight line surface 51 to contact the ends of treads on a normal stairs, as shown by FIGURE 2, whereby the vehicle is driven up the stairs by the occupant pulling backward on the drive wheels 21. The belts along surface 51 operate on a rigid track 52 which is integral with frame 41, as shown in FIGURES 1 and 2, and thereby afford a firm surface to contact the stair treads and effect maximum traction therewith.

As shown in FIGURE 1, the belt traction units are up under the seat of the vehicle and out of contact when the vehicle operates on its wheels over flat surfaces.

Referring to FIGURE 6, which shows structure common to both sides of the vehicle, the idler unit 43 comprises a sprocket 53 supporting conventional steel roller chain 54 of the bent side plate attachment type. The chain 54 being of steel will not stretch detrimentally. A rubber pad, or shoe 55 is vulcanized on the bent over side plates of each link of link 54 and each shoe generally has a protruding lug portion 56 to effect adequate traction with the stair treads. The sprocket 53 is rotatively mounted on a stud 57 by bearings 58. The stud 57 is free in frame 41 and is secured in link 46 by a set screw.

Referring to FIGURES 4 and 5, which show structure common to both sides of the vehicle, the traction belt drive unit sprocket 40 is integral with the traction belt sprocket 59 and a brake drum 60 and this combined unit, which could be formed from one piece of material as shown, is rotatively mounted on a stud 61 by means of bearings 62. The stud 61 is free in frame 41 and is secured in frame 10 by a set screw 63.

The braking of drum 60 is accomplished by a brake shoe 64 pivoted to a link 65 at 66. Link 65 is pivoted to frame 41 at 67. An extension spring 68 is attached to link 65 at 69 and to a projecting portion 70 of frame 41 at 71. Spring 68 retains the shoe 64 in contact with drum 60 due to the angular disposition of the link and shoe. Another link 72 is pivoted to shoe 64 at 66 and to a lever 73 at 81 which is pivoted to a portion 83 of frame 41 at 74. A boss 82 integral with portion 70 of frame 41 extends outwardly to abut link 65.

When the drum is rotated in the direction of the arrow, which is the direction it would rotate when the vehicle is descending an obstruction, the friction between the drum and shoe, augmented by the spring 68, drags the shoe in the direction of rotation and the shoe becomes wedged against the drum due to the wedging position of the link 65 and locks the drum. However, when the drum is rotated in the opposite direction, which is the direction of rotation when the vehicle is climbing an obstruction, the friction between the shoe and drum will drag the shoe and free it from the wedging action and thereby relieve the braking action of the shoe. In other words, the mechanism just described is a so-called anti-back lash device which will allow rotation in one direction and check rotation in the reverse direction. Therefore, the vehicle is checked against moving backward due to gravity when it is ascending.

When the vehicle is descending the shoe can be moved to a neutral position by the occupant manipulating lever 75 and thereby allow the vehicle to descend. Obviously, the required amount of braking to effect smooth descending by gravity can be obtained by proper control of lever 73.

It will be noted that each traction belt is manually propelled independently by a drive wheel 21 and each is controlled independently by the occupant of the vehicle. Therefore, the vehicle is susceptible of being turned in a small area when being moved on the traction belts as well as when being moved on the wheels. Therefore, the vehicle can be readily moved around on L landings and U landings in stairways.

The ratio of the drive from the drives wheels to the traction belts is such that the vehicle can be driven up a stairs by a minimum of pull on each wheel. Furthermore, the drive wheels are considerably larger than the traction belt wheels which affords considerable mechanical advantage in the driving power for reason the occupant is pulling on the rim of the drive wheels which affords a relatively long lever arm.

To operate the vehicle up a stairs, as indicated by FIGURE 2, the occupant backs the vehicle against the lower stair tread and then manipulates lever 44 on each side frame which forces the lower end of the traction belts down against the floor and effects raising of the vehicle and freeing the drive wheels from contact with the the floor, as indicated in FIGURE 2.

The occupant then manipulates the levers 39 on each side frame which engages the jaw clutches and the drive to each traction device. The occupant then mobiles the vehicle backward up the stairs by pulling on the drive wheels 21. The wheels 22 pivot in under the vehicle upon contacting the stairs thereby permitting the traction belts to contact the ends of the stair treads. The vehicle is then moved up the stairs and can be swung in a small space on landings, if encountered, through manipulation of the drive wheels because each belt is driven independently through a respective drive wheel.

The normal balance of the vehicle is in back of the centerline of the main wheels 21 and therefore it will tip toward the swivel wheels 22 which are positioned at the rear of the wheels 21. Should the vehicle tip forward due to an invalid moving in or out of the seat, the foot rest 19 will contact the floor and thereby steady the vehicle.

After an occupant is seated in the vehicle, the center of gravity is back of the center line of the drive wheels and inasmuch as the straight incline portion 51 of the belt traction devices extend to the center of said wheels, the vehicle will not tip forward, or downward relative to the stairs, when being driven up a flight of stairs.

The swivel wheels 22 abut and follow the contour of the stairs due to the reaction of springs 24 as the vehicle climbs and swings outward onto the landing due to the same spring reaction after they pass over the top step preceding a landing. Therefore, wheels 22 act to steady the vehicle as the traction belts pass over the top step. After the vehicle has passed over the top step, it will tip to a slight backward inclined position due to traveling on the lower surface of the belts and the swivel wheels during the turning and the backing of the vehicle against the next flight of stairs to be climbed.

Upon reaching the floor at the top of the stairway, the occupant would manipulate lever 44 to raise the traction device and allow the vehicle to lower and rest on the drive wheels 21 and the swivel wheels 22.

Descending a stairs is accomplished in much the same manner except the occupant is required to operate the brakes, as set forth in the specification to FIGURES 4 and 5, to release the anti-back lash feature and brake the gravitational downward travel of the vehicle. An attendant could be employed to steady the vehicle as it ascends or decends intermediate the top step on a stairs and the landing above, if desired, and at such time the attendant could also manipulate the swinging of the swivel wheels to insure proper operation, if necessary on occasions.

When the vehicle is traveling backward on a plane surface, the wheels 22 will not inadvertently swing in under the chair due to the position of the pivot of the arm 23 which would require the vehicle and occupant to be lifted to permit the wheels 22 to recede. However, when the wheels 22 contact the stairs by the vehicle being driven backward the arm 23 will be forced in under the vehicle by the driving force and would cause the rear of the vehicle to raise sufficiently to allow the wheels to recede.

I do not wish to be confined to the exact details set forth as the same are susceptible of modification within the spirit and scope of the invention. One example being, rigid structure instead of collapsible structure could be employed to hold the side frames in spaced relationship.

I claim:

1. An occupant propelled and controlled obstruction-climbing wheel chair comprising rigid side frames sustained in spaced relationship by collapsible structure forming a chair comprising a seat, a back and a foot rest, a drive wheel rotatively mounted in fixed position in each side frame at the front or foot rest end of said chair, a swivel wheel pivotly mounted in fixed position in each side frame at the rear of said chair, each swivel wheel being disposed to swing out of normal position to facilitate climbing obstructions, resilient means to urge each swivel wheel toward its normal position for operating on plane surfaces, a traction belt device comprising a frame carrying two rotatable members in spaced relationship with an endless belt operating thereover pivotly mounted in fixed position in each side frame by a lateral extension of one of the rotatable members extending into the frame at the rear thereof, the other rotatable member extending under said chair and being connected to a lever means pivoted in each side frame, respectively, said means being disposed to be swung by the occupant of the chair to raise the said other rotatable member out of contact with plane surfaces on which the wheels would normally operate and to lower the said member to contact said surfaces and thereby effect raising of the front of the chair to raise the drive wheels out of contact with surfaces as set forth, independent drive means connecting each drive wheel to each traction device, respectively, means to engage and disengage each said drive means, means to check the movement of each traction belt in one direction.

2. An occupant propelled and controlled obstruction-climbing wheel chair comprising rigid side frames, lateral structure retaining said frames in spaced relationship, a chair comprising a seat, a back and a foot rest formed by said structure, a drive wheel rotatively mounted in fixed position in each side frame at the front or foot rest end of said chair, a swivel wheel pivotly mounted in fixed position in each side frame at the rear of said chair, each swivel wheel being disposed to swing out of normal position to facilitate climbing obstructions, resilient means to urge each swivel wheel toward its normal position for operating on plane surfaces, a traction belt device comprising a frame carrying two rotatable members in spaced relationship with an endless belt operating thereover pivotly mounted in fixed position in each side frame by a lateral extension of one of the rotatable members extending into the frame at the rear thereof, the other rotatable member extending under said chair and being connected to a lever means pivoted in each side frame, respectively, said means being disposed to be swung by the occupant of the chair to raise the said other rotatable member out of contact with plane surfaces on which the wheels would normally operate and to lower the said member to contact said surfaces and thereby effect raising of the front of the chair to raise the drive wheels out of contact with surfaces as set forth, independent drive means connecting each drive wheel to each traction device, respectively, means to engage and disengage each said drive means, means to check the movement of each traction belt in one direction.

3. A wheel chair as described in claim 1, with the swivel wheels located back of the chair and back of the center of gravity of the vehicle when occupied, each swivel wheel being movably mounted to each side frame, respectively.

4. A wheel chair as described in claim 1, with the traction belt movement checking means being automatic with manual means to counteract the automatic means and effect a braking means.

5. A wheel chair as described in claim 1, with each traction belt operating on a rigid track extending in under the portion of the belt operatively disposed to contact obstructions.

6. A wheel chair as described in claim 1, with each traction device pivoted substantially at the rear end of each side frame, respectively, and means to swing each device in and out of service being mounted on each side frame, respectively, forward of the pivot.

7. An obstruction-climbing wheel chair as described in claim 2 with means to counteract the traction belt checking means and afford a braking effect to the movement of said belts in said direction.

8. An obstruction-climbing wheel chair as described in claim 2, having structure to abut the under side of the portion of each traction belt operatively disposed to contact obstructions for the purpose of augmenting the tractional contact of each belt with the obstruction.

References Cited in the file of this patent

UNITED STATES PATENTS

| | | |
|---|---|---|
| 838,228 | Williams | Dec. 11, 1906 |
| 2,597,532 | Richardson et al. | May 20, 1952 |
| 2,765,860 | Church | Oct. 9, 1956 |
| 2,798,565 | Rosenthal et al. | July 9, 1957 |

FOREIGN PATENTS

| | | |
|---|---|---|
| 662,667 | Germany | July 19, 1938 |
| 693,983 | Great Britain | July 8, 1953 |

OTHER REFERENCES

Pamphlet, "Wanted: A Stair-Climbing Wheel Chair," January 1962, National Inventors Council, pages 16–26 only, relating to the Lionel Freeman wheelchair.